US012136511B2

(12) United States Patent
Asai et al.

(10) Patent No.: US 12,136,511 B2
(45) Date of Patent: Nov. 5, 2024

(54) COIL COMPONENT AND ITS MANUFACTURING METHOD

(71) Applicant: TDK Corporation, Tokyo (JP)

(72) Inventors: Yugo Asai, Tokyo (JP); Aoi Tokiwa, Tokyo (JP); Daisuke Urabe, Tokyo (JP)

(73) Assignee: TDK CORPORATION, Tokyo (JP)

(*) Notice: Subject to any disclaimer, the term of this patent is extended or adjusted under 35 U.S.C. 154(b) by 790 days.

(21) Appl. No.: 17/189,854

(22) Filed: Mar. 2, 2021

(65) Prior Publication Data

US 2021/0280357 A1 Sep. 9, 2021

(30) Foreign Application Priority Data

Mar. 3, 2020 (JP) ................................. 2020-035712

(51) Int. Cl.

*H01F 27/29* (2006.01)
*H01F 27/26* (2006.01)
*H01F 27/28* (2006.01)
*H01F 41/064* (2016.01)

(52) U.S. Cl.

CPC ......... *H01F 27/2823* (2013.01); *H01F 27/26* (2013.01); *H01F 27/29* (2013.01); *H01F 41/064* (2016.01)

(58) Field of Classification Search

CPC ...... H01F 27/2823; H01F 27/26; H01F 27/29; H01F 27/2828; H01F 27/292; H01F 27/306; H01F 17/045

See application file for complete search history.

(56) References Cited

U.S. PATENT DOCUMENTS

| | | | | |
|---|---|---|---|---|
| 2010/0194517 | A1* | 8/2010 | Karasek | H01F 17/045 336/221 |
| 2016/0365191 | A1* | 12/2016 | Horie | H01F 27/2823 |
| 2017/0025212 | A1* | 1/2017 | Jerez | H01F 27/29 |
| 2017/0345557 | A1* | 11/2017 | Igarashi | H01F 5/06 |
| 2018/0096790 | A1* | 4/2018 | Murakami | H01F 41/076 |
| 2018/0182534 | A1* | 6/2018 | Horie | H01F 27/292 |
| 2018/0211756 | A1* | 7/2018 | Kuo | H01F 27/29 |
| 2018/0261365 | A1* | 9/2018 | Igarashi | H01F 27/2828 |
| 2018/0261379 | A1 | 9/2018 | Igarashi | |
| 2018/0261381 | A1* | 9/2018 | Igarashi | H01F 27/32 |

FOREIGN PATENT DOCUMENTS

| | | | | |
|---|---|---|---|---|
| JP | 2018-148081 A | | 9/2018 | |
| WO | 2015045955 | * | 4/2015 | |
| WO | WO-2015045955 A1 | * | 4/2015 | H01F 27/292 |

* cited by examiner

*Primary Examiner* — Mang Tin Bik Lian
(74) *Attorney, Agent, or Firm* — Rimon P.C.

(57) ABSTRACT

Disclosed herein is a coil component that includes: a drum-shaped core including a flange part and a winding core part; a terminal fitting fixed to the flange part; and a wire wound around the winding core part and having an end portion connected to the terminal fitting. The flange part has an outer surface positioned on a side opposite to the winding core part. The terminal fitting has a positioning part for positioning the wire and a weld bead formed as a result of welding between the terminal fitting and the end portion of the wire. The positioning part and weld bead are both positioned on the outer surface of the flange part. The weld bead has a protruding part that does not overlap the flange part.

8 Claims, 6 Drawing Sheets

COIL COMPONENT AND ITS MANUFACTURING METHOD

BACKGROUND OF THE INVENTION

Field of the Invention

The present invention relates to a coil component and its manufacturing method and, more particularly, to a coil component using a drum-shaped core and its manufacturing method.

Description of Related Art

As a coil component using a drum-shaped core, a coil component described in JP 2018-148081A is known. The coil component described in JP 2018-148081A has two wires wound around a winding core part of a drum-shaped core thereof, and one end of each of the two wires is connected to a terminal fitting provided on one flange part, and the other end thereof is connected to a terminal fitting provided on the other flange part. In the coil component of JP 2018-148081A, wire connection is made by welding.

However, in the invention of JP 2018-148081A, weld beads formed as a result of welding are positioned on the mounting surface side of the coil component. Thus, to prevent interference between the weld beads and a circuit board in actual use, it is necessary to form a cutout for accommodating the weld beads in the drum-shaped core. This, however, significantly reduces the volume of the drum-shaped core, resulting in deterioration in magnetic characteristics.

SUMMARY

It is therefore an object of the present invention to provide a coil component in which the wire and the terminal fitting are connected by welding, capable of enhancing magnetic characteristics by sufficiently reserving the volume of the drum-shaped core. Another object of the present invention is to provide a manufacturing method for such a coil component.

A coil component according to the present invention includes: a drum-shaped core including a flange part and a winding core part; a terminal fitting fixed to the flange part; and a wire wound around the winding core part and having one end connected to the terminal fitting. The flange part has an outer surface positioned on the side opposite to the winding core part. The terminal fitting has a positioning part for positioning the wire and a weld bead formed as a result of welding between the terminal fitting and the end portion of the wire. The positioning part and weld bead are both positioned on the outer surface of the flange part. The weld bead has a protruding part that does not overlap the flange part.

According to the present invention, the weld bead formed as a result of welding between the terminal fitting and the end portion of the wire is positioned on the outer surface of the flange part, thus eliminating the need for forming, in the drum-shaped core, a cutout for preventing interference with a circuit board in actual use. This allows the volume of the drum-shaped core to be made sufficient, making it possible to enhance magnetic characteristics. Further, a part of the weld bead does not overlap the flange part, making it possible to reduce damage to the drum-shaped core during the welding process.

In the present invention, the extending direction of the wire may change before and after the positioning part. Further, the positioning part may position the wire by sandwiching the wire. Thus, it is possible to position the wire more accurately.

A coil component manufacturing method according to the present invention includes: a first step of preparing a drum-shaped core including a flange part and a winding core part and fixing a terminal fitting having a positioning part and a welding part to the flange part such that the positioning part and the welding part are disposed on the outer surface of the flange part on the side opposite to the winding core part; a second step of winding the wire around the winding core part and positioning the end portion of the wire to the welding part using the positioning part; and a third step of heating the welding part to weld the end portion of the wire to the welding part to thereby form a weld bead. The welding part has a protruding part that does not overlap the flange part, whereby a part of the weld bead protrudes from the flange part.

According to the present invention, the positioning part and the welding part are provided on the outer surface of the flange part, allowing the volume of the drum-shaped core to be made sufficient. In addition, a part of the weld part does not overlap the flange part, making it possible to reduce damage to the drum-shaped core due to heating.

In the present invention, the welding part may sandwich the end portion of the wire. Thus, it is possible to temporarily fix the wire more accurately.

In the present invention, the third step may be performed by irradiating a laser beam such that the center of the laser beam is positioned at the protruding part. This makes it possible to reduce damage to the drum-shaped core due to irradiation of the laser beam.

As described above, according to the present invention, there can be provided a coil component in which the wire and the terminal fitting are connected by welding, capable of sufficiently reserving the volume of the drum-shaped core. This makes it possible to enhance magnetic characteristics.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings.

First Embodiment

Figure 1:
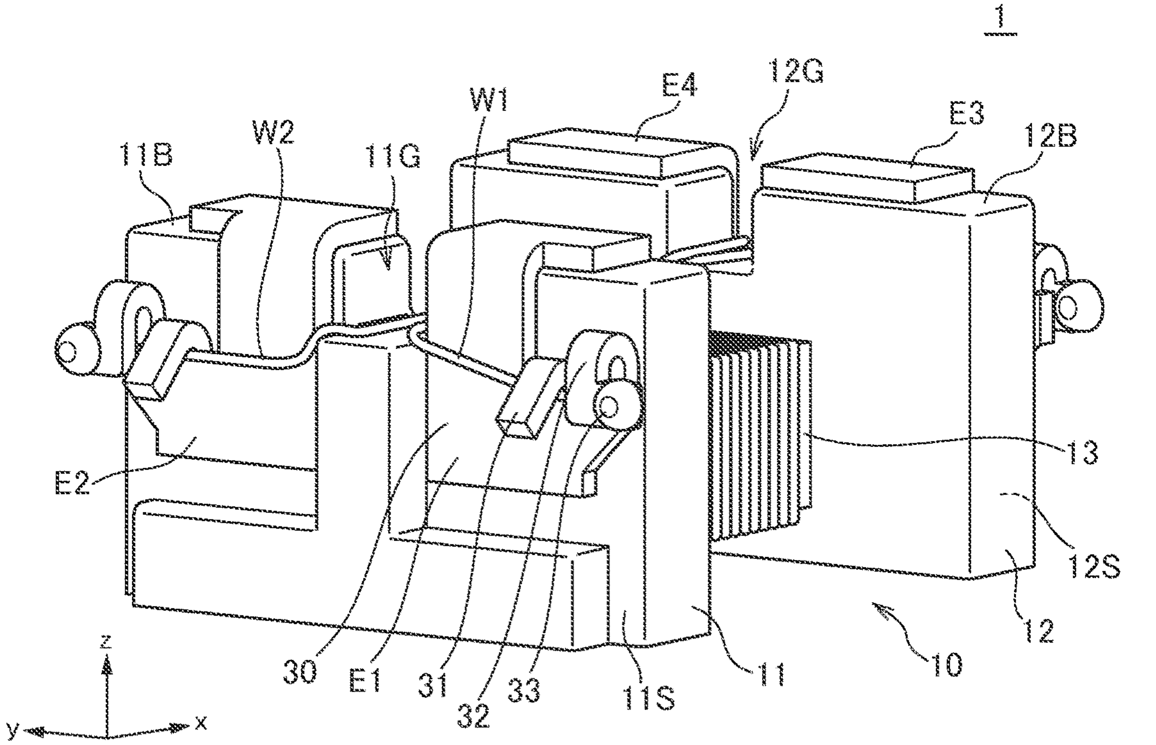
FIG. 1 is a schematic perspective view illustrating the outer appearance of a coil component 1 according to a first embodiment of the present invention.

FIG. 1 is a schematic perspective view illustrating the outer appearance of a coil component 1 according to a first embodiment of the present invention.

The coil component 1 according to the present embodiment is a common mode choke coil and includes, as illustrated in FIG. 1, a drum-shaped core 10, terminal fittings E1 to E4, and wires W1 and W2. As a material for the drum-shaped core 10, a magnetic material having a high permeability such as ferrite is used. The magnetic material used for the drum-shaped core 10 preferably has a permeability μ of 10 H/m to 4000 H/m.

The drum-shaped core 10 includes a winding core part 13 with its axis directed in the x-direction, a flange part 11 provided on one end of the winding core part 13 in the x-direction, and a flange part 12 provided on the other end of the winding core part 13 in the x-direction. The terminal fittings E1 and E2 are provided on the flange part 11 and arranged in the y-direction in this order. The terminal fittings E3 and E4 are provided on the flange part 12 and arranged in the y-direction in this order. The wires W1 and W2 are wound around the winding core part 13. One ends of the wires W1 and W2 are connected to the terminal fittings E1 and E2, respectively, and the other ends thereof are connected to the terminal fittings E3 and E4, respectively. The number of turns and the winding direction of the wire 1 are the same those of the wire 2. The wires W1 and W2 each have a structure obtained by coating a core material thereof such as copper with a coating material such as polyamide-imide. The softening resistant temperature of the coating material is preferably 250° C. or higher.

The flange parts 11 and 12 of the drum-shaped core 10 have outer surfaces 11S and 12S constituting the yz plane, bottom surfaces 11B and 12B constituting the xy plane. The terminal fittings E1 and E2 each have an L-shape formed over the outer surface 11S and bottom surface 11B of the flange part 11, and the terminal fittings E3 and E4 each have an L-shape formed over the outer surface 12S and bottom surface 12B of the flange part 12. Further, the terminal fittings E1 to E4 each have a body part 30 that covers the outer surface 11S or 12S, a positioning part 31 continuing from the body part 30, a welding part 32, and a weld bead 33. A part of the outer surface (11S, 12S) that is not covered with the terminal fitting (E1 to E4) protrudes in the x-direction, thereby increasing the volume of the flange part (11, 12).

As illustrated in FIG. 1, a groove 11G is formed in the bottom surface 11B of the flange part 11 so as to extend in the x-direction, and a groove 12G is formed in the bottom surface 12B of the flange part 12 so as to extend in the x-direction. Leading portions of the wires W1 and W2 positioned between the winding core part 13 and the terminal fittings E1, E2 are accommodated in the groove 11G, and leading portions of the wires W1 and W2 positioned between the winding core part 13 and the terminal fittings E3, E4 are accommodated in the groove G12. This allows the wires W1 and W2 to extend along each other not only at parts thereof that are wound around the winding core part 13 but also at the leading portions, thereby reducing a variation in characteristics such as an S parameter.

The wires W1 and W2 passing through the grooves 11G and 12G are each positioned in terms of the z-direction by the positioning part 31 and fixed by weld bead 33 adjacent to the positioning part 31 in the y-direction. The positioning part 31 has a tab shape that sandwiches the wire (W1, W2) and the extending direction of the wire (W1, W2) changes before and after the positioning part 31. In the example illustrated in FIG. 1, the leading portion of the wire (W1, W2) extends in the positive y-direction or negative y-direction while running in the negative z-direction in a section between the groove 11G or 12G and the positioning part 31 and linearly extends in the positive y-direction or negative y-direction in a section between the positioning part 31 and the weld bead 33. Thus, the positioning part 31 positions the wire (W1, W2) by sandwiching it, and the extending direction of the wire (W1, W2) changes before and after the positioning part 31, whereby the wires W1 and W2 can be accurately positioned.

The weld bead 33 is a metal lump formed as a result of welding between the welding part 32 and the end portion of the wire (W1, W2). The welding part 32, which has a tab shape that sandwiches the wire (W1, W2), is larger in size than the positioning part 31 so as to form the weld bead 33 having a sufficient size through the welding.

Figure 2:
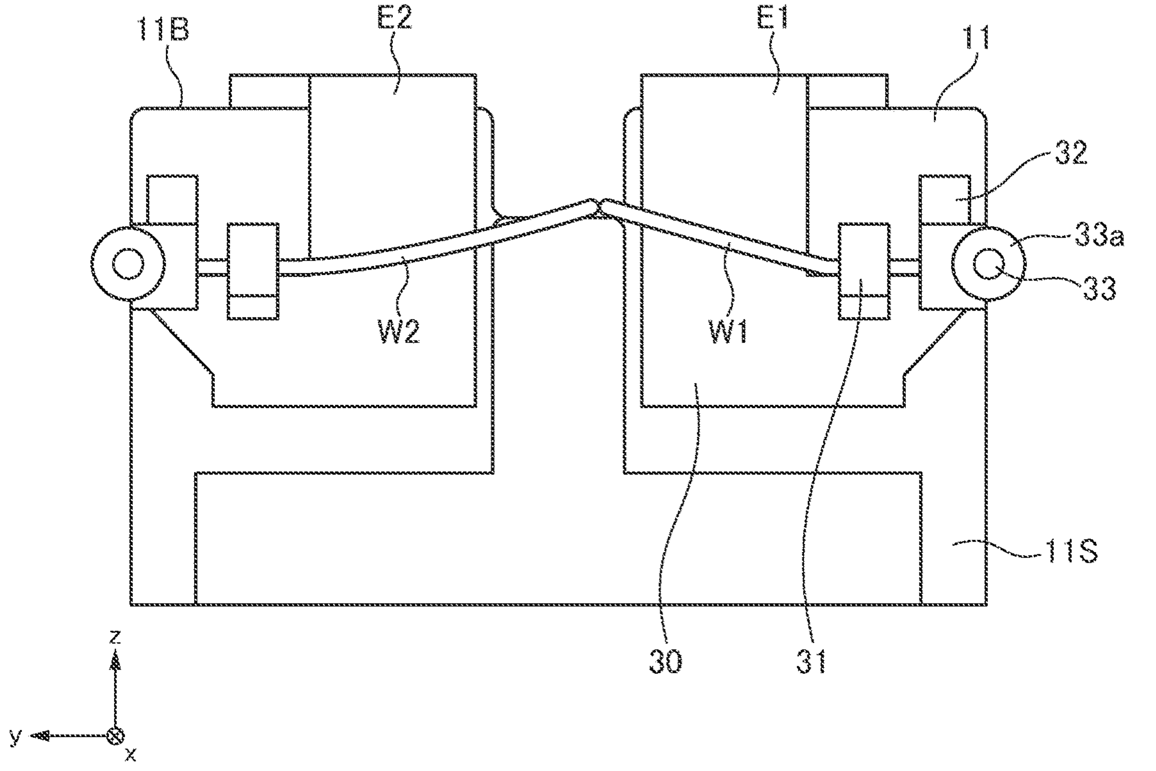
FIG. 2 is a schematic front view of the coil component 1 as viewed in the x-direction.

FIG. 2 is a schematic front view of the coil component 1 according to the present embodiment as viewed in the x-direction. As illustrated in FIG. 2, a part of the weld bead 33 constitutes a protruding part 33*a* that does not overlap the flange (11, 12). The wire (W1, W2) is exposed between the positioning part 31 and the weld bead 33. The formation of the protruding part 33*a* in the weld bead 33 is due to the following manufacturing process.

Figure 3:
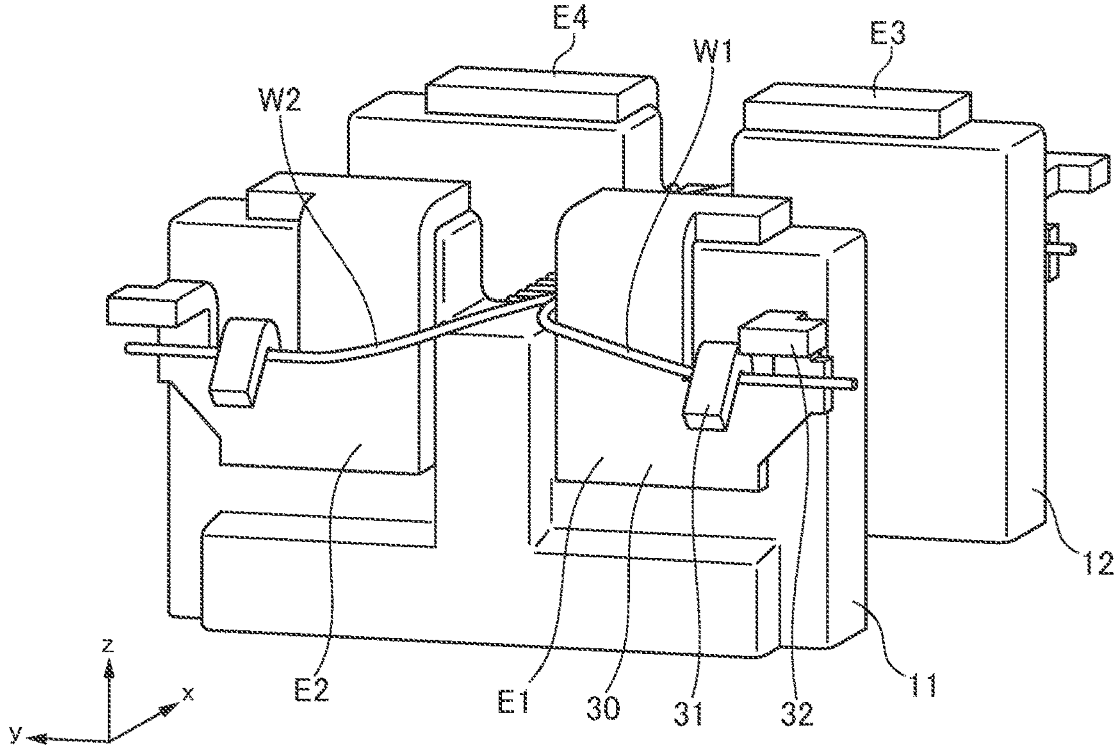
FIGS. 3 to 5 are process views for explaining a manufacturing process of the coil component 1.

In the manufacturing process of the coil component 1, first the drum-shaped core 10 is prepared, and the terminal fittings E1 to E4 are fixed to the flange parts 11 and 12 of the drum-shaped core 10. The fixing of each of the terminal fittings E1 to E4 is achieved by using an adhesive. Then, the wires W1 and W2 are wound around the winding core part 13, and the end portion of the wire (W1, W2) is positioned at the welding part 32 by the positioning part 31. At this time, the welding part 32 is in an opened (unfolded) state as illustrated in FIG. 3, and the wire (W1 and W2) is positioned by the positioning part 31 in terms of the z-direction.

Figure 4:
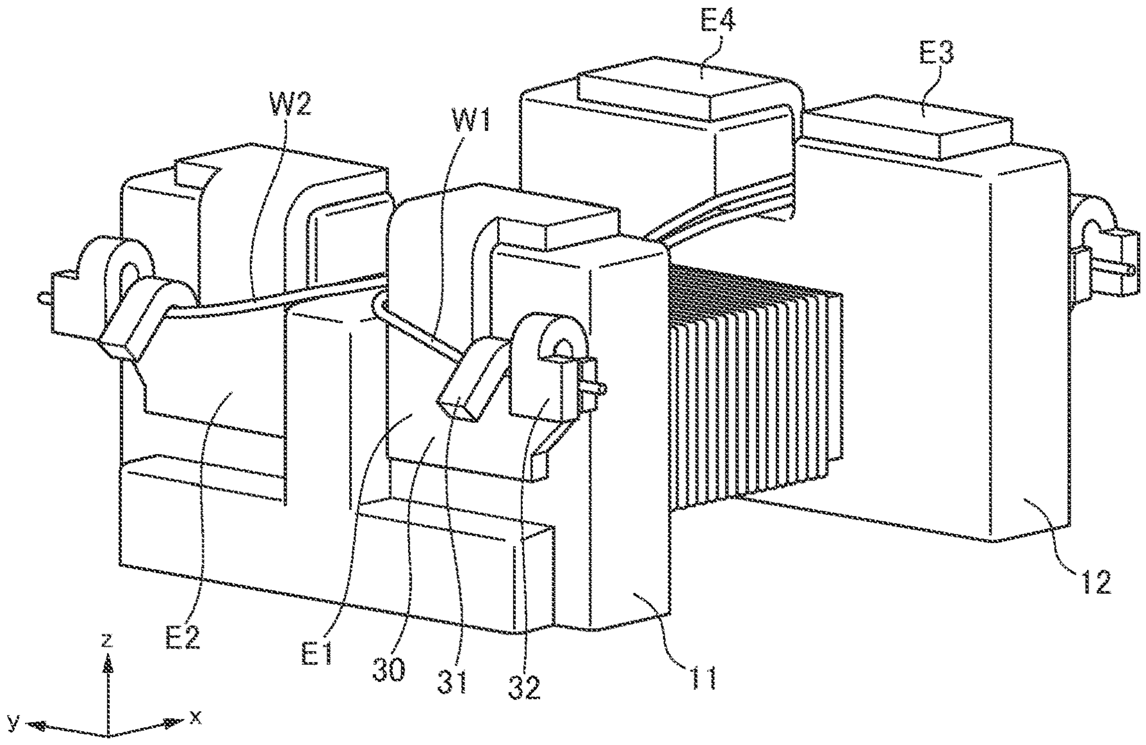
Figure 5:
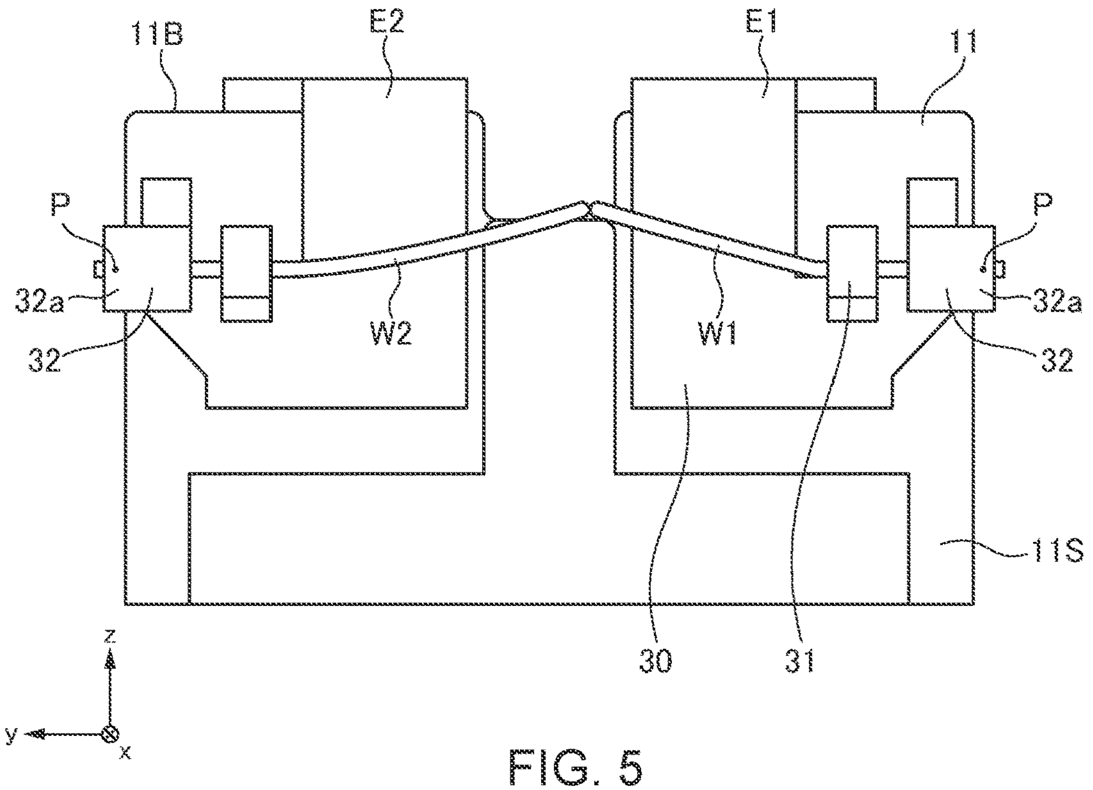

Then, as illustrated in FIG. 4, the welding part 32 is folded to sandwich the end portion of the wire (W1, W2). As a result, the end portion of the wire (W1, W2) is temporarily fixed to the welding part 32. In this state, a laser beam is irradiated onto the welding part 32 for heating to integrate the end portion of the wire (W1, W2) and the welding part 32, obtaining the weld bead 33. Thus, the end portion of the wire (W1, W2) is firmly fixed by the weld bead 33. The laser beam is irradiated with a center P thereof positioned at a protruding part 32*a* of the welding part 32, as illustrated in FIG. 5. That is, the laser beam irradiation is performed so as not to make the center P of the laser beam at which a temperature becomes the highest overlap the flange part (11, 12). This suppresses damage to the flange parts W11 and W12 due to the laser beam irradiation, increasing product reliability.

As described above, in the coil component 1 according to the present embodiment, the end portions of the wires W1 and W2 are fixed to the terminal fittings E1 to E4 by welding, so that the connection therebetween can be firmer than when they are connected by soldering or thermal compression. In addition, the weld bead 33 formed as a result of welding the end portion of the wire (W1, W2) is positioned on the outer surface of the flange part (11, 12), thus eliminating the need for forming, in the drum-shaped core 10, a cutout for preventing interference between the weld beads 33 and a circuit board in actual use. This allows the volume of the drum-shaped core 10 to be made sufficient, making it possible to enhance magnetic characteristics. Further, in a welding process, the laser beam is irradiated such that the center P thereof does not overlap the flange part (11, 12), making it possible to reduce damage to the flange parts 11 and 12 due to the laser irradiation.

Figure 6:
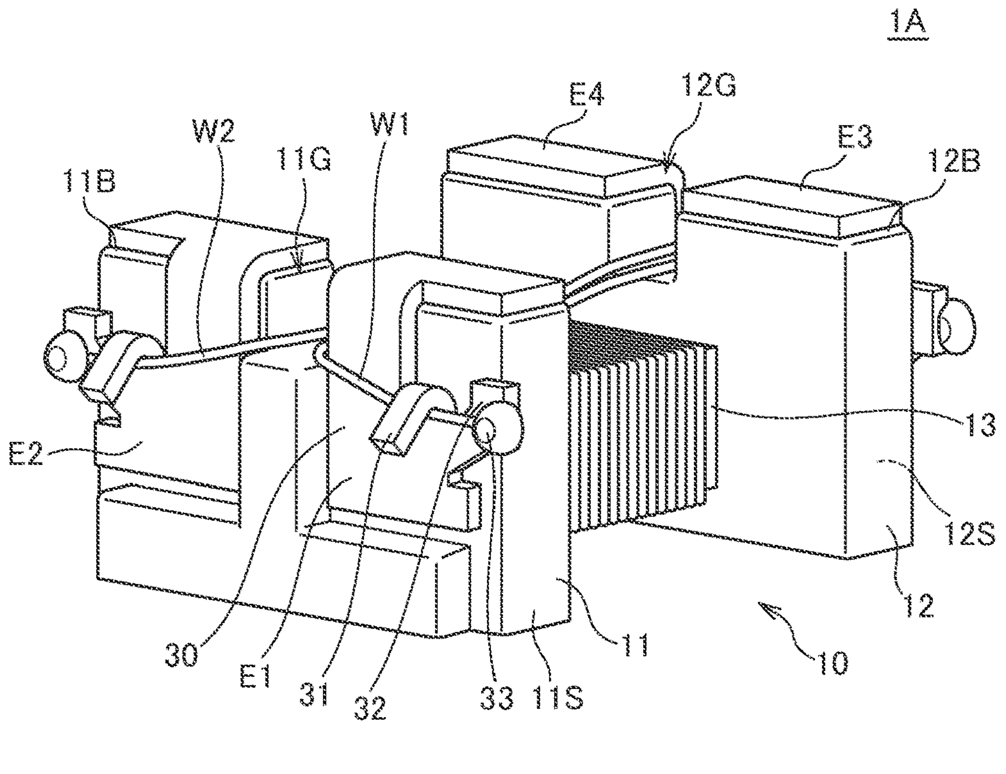
FIG. 6 is a schematic perspective view illustrating the outer appearance of a coil component 1A according to a modification.

FIG. 6 is a schematic perspective view illustrating the outer appearance of a coil component 1A according to a modification.

The coil component 1A according to the modification differs from the above coil component 1 in that the welding part 32 does not have the tab shape but has a flat plate shape. Other basic configurations are the same as those of the above coil component 1, so the same reference numerals are given to the same elements, and overlapping description will be omitted.

Figure 7:
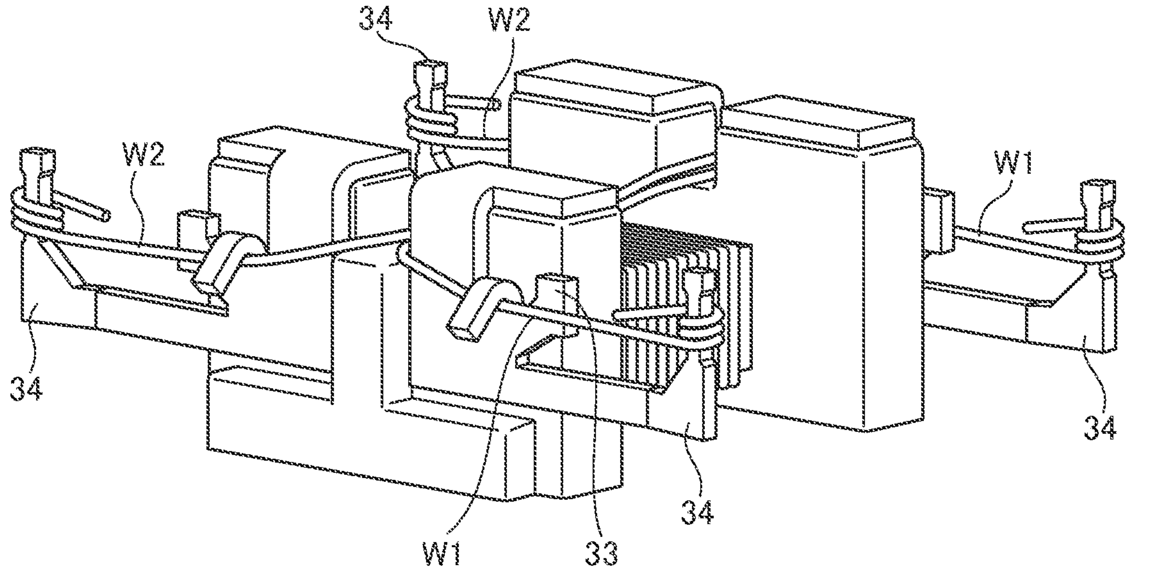
FIG. 7 is a process view for explaining a manufacturing process of the coil component 1A.

As exemplified by the coil component 1A according to the modification, the welding part 32 may not necessarily have the foldable tab shape but may have a flat plate shape as long as it has a volume large enough to form the weld bead 33. In a manufacturing process of the coil component 1A according to the modification, the terminal fittings E1 to E4 may each have a temporary stopping part 34, as illustrated in FIG. 7. The temporary stopping part 34 is used, together with the positioning part 31, to position the end portion of the wire (W1, W2) onto the welding part 32 having the flat plate shape. A laser beam is irradiated in a state where the end portion of the wire (W1, W2) is positioned at the welding part 32, whereby the weld bead 33 can be formed. After that, the temporary stopping part 34 is cut, and thus the coil component 1A according to the modification is completed.

Second Embodiment

Figure 8:
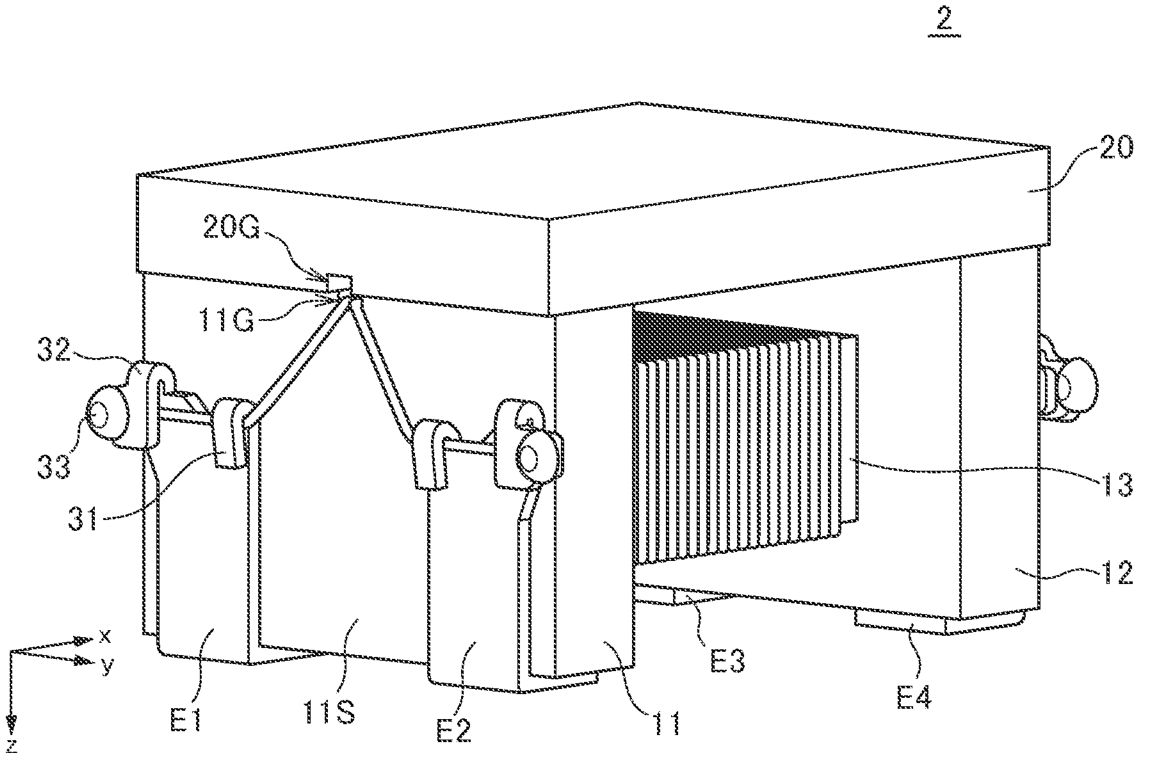
FIG. 8 is a schematic perspective view illustrating the outer appearance of a coil component 2 according to a second embodiment of the present invention.

FIG. 8 is a schematic perspective view illustrating the outer appearance of a coil component 2 according to a second embodiment of the present invention.

As illustrated in FIG. 8, the coil component 2 according to the second embodiment differs from the coil component 1 according to the first embodiment in that it further has a plate-like core 20. As a material for the plate-like core 20, a magnetic material having a high permeability such as ferrite is used. The same magnetic material or different magnetic materials may be used for the drum-shaped core 10 and the plate-like core 20. Further, in the coil component 2 according to the present embodiment, the outer surfaces 11S and 12S of the flange parts 11 and 12 are flattened. Further, the grooves 11G and 12G are formed in the surfaces of the flange parts 11 and 12 on the side opposite to the bottom surfaces 11B and 12B, that is, surfaces facing the plate-like core 20. Other basic configurations are the same as those of the coil component 1 according to the first embodiment, so the same reference numerals are given to the same elements, and overlapping description will be omitted.

A groove 20G is formed in the surface of the plate-like core 20 that faces the flange parts 11 and 12. The groove 20G extends in the x-direction while overlapping the grooves 11G and 12G. In the present embodiment, the size of the grooves 11G and 12G is reduced as compared with that in the first embodiment, whereby the volumes of the flange parts 11 and 12 are increased. Further, the grooves 11G and 12G are narrow, so that the wires W1 and W2 are positioned in the grooves 11G and 12G so as to extend right in the x-direction along each other, thereby reducing a variation in characteristics such as an S parameter. When the grooves G11 and G12 are narrow, the wires W1 and W2 may protrude from the grooves 11G and 12G due to manufacturing variation; however, the presence of the groove 20G in the plate-like core 20 prevents interference between the wires W1, W2 and the plate-like core 20.

Figure 9:
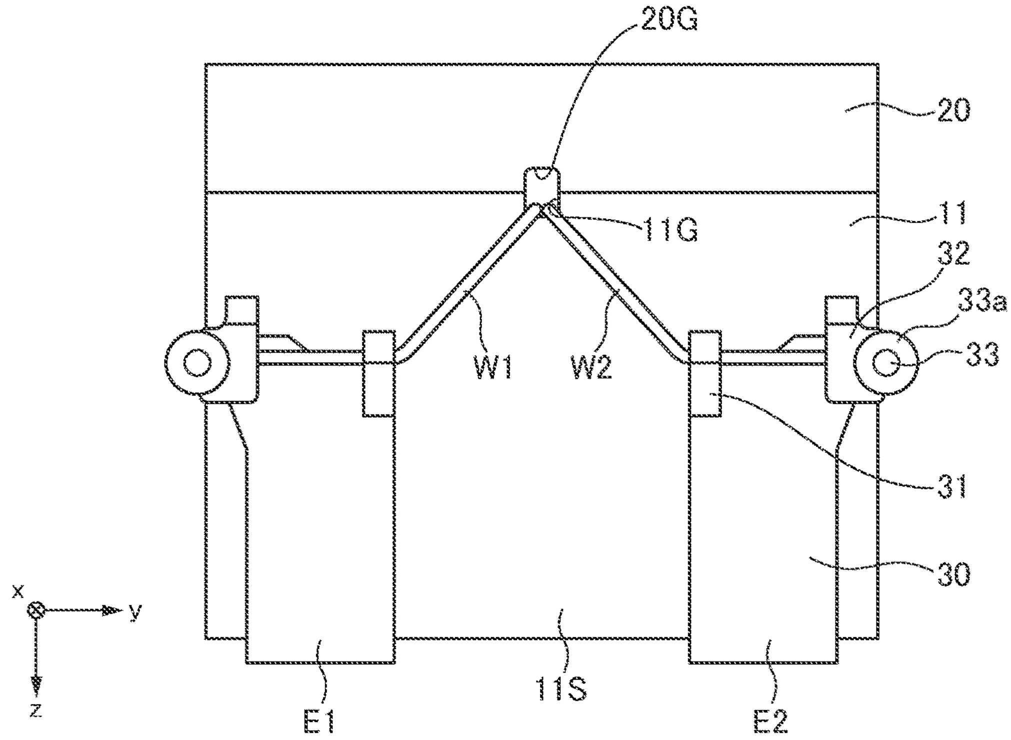
FIG. 9 is a schematic front view of the coil component 2 as viewed in the x-direction.

FIG. 9 is a schematic front view of the coil component 2 according to the present embodiment as viewed in the x-direction. As illustrated in FIG. 9, in the present embodiment as well, a part of the weld bead 33 constitutes the protruding part 33*a* that does not overlap the flange part (11, 12). Further, the wire (W1, W2) is exposed between the positioning part 31 and the weld bead 33.

Figure 10:
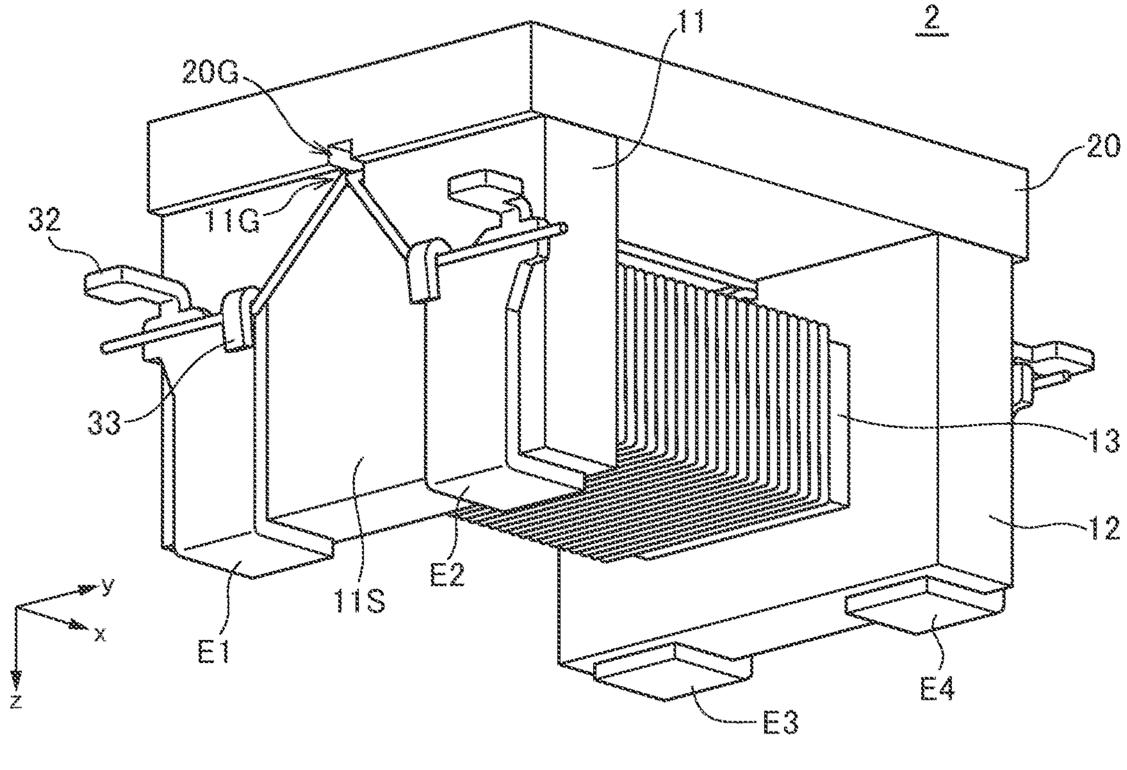
FIGS. 10 and 11 are process views for explaining a manufacturing process of the coil component 2.

In a manufacturing process of the coil component 2, first the drum-shaped core 10 is prepared, and the terminal fittings E1 to E4 are fixed to the flange parts 11 and 12 of the drum-shaped core 10. The fixing of each of the terminal fittings E1 to E4 is achieved by using an adhesive. Then, the wires W1 and W2 are wound around the winding core part 13, and the end portion of the wire (W1, W2) is positioned at the welding part 32 by the positioning part 31. At this time, the welding part 32 is in an opened (unfolded) state as illustrated in FIG. 10, and the wire (W1 and W2) is positioned by the positioning part 31 in terms of the z-direction.

Figure 11:
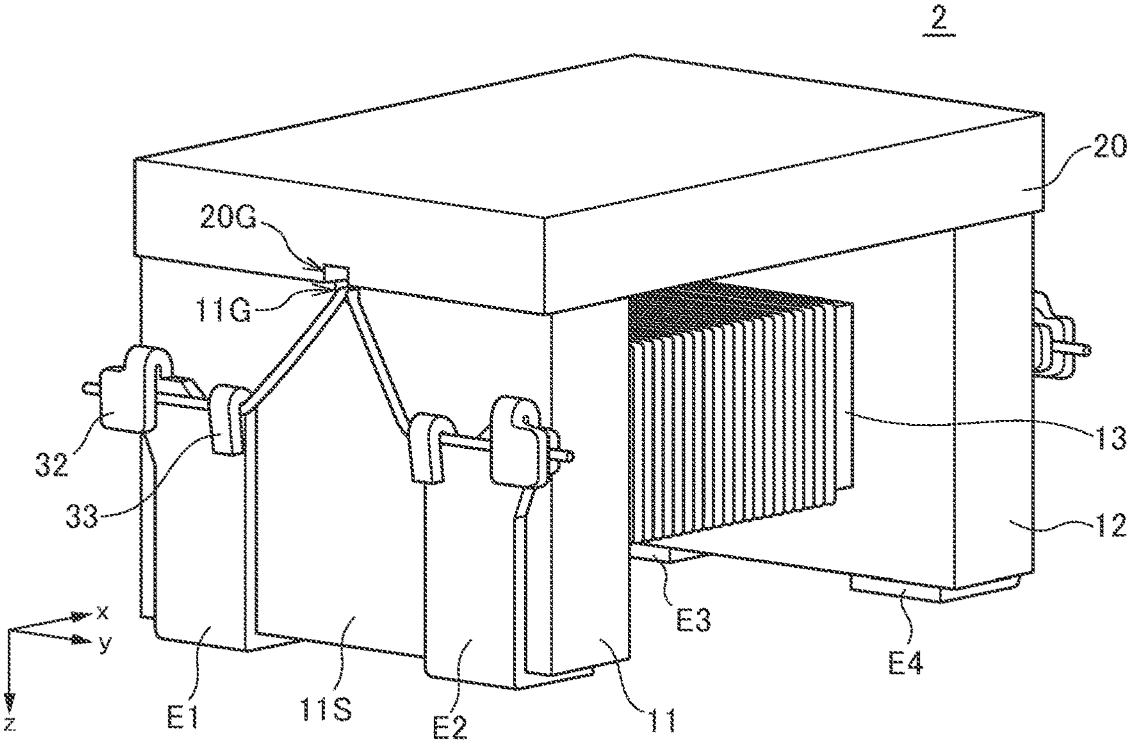

Then, as illustrated in FIG. 11, the welding part 32 is folded to sandwich the end portion of the wire (W1, W2). As a result, the end portion of the wire (W1, W2) is temporarily fixed to the welding part 32. In this state, laser beam is irradiated onto the welding part 32 for heating to integrate the end portion of the wire (W1, W2) and the welding part 32, obtaining the weld bead 33. Thus, the end portion of the wire (W1, W2) is firmly fixed by the weld bead 33. As described using FIG. 5, the laser beam is irradiated with the center P thereof positioned at the protruding part 32*a* of the welding part 32. That is, the laser beam irradiation is performed so as not to make the center P of the laser beam at which the temperature becomes the highest overlap the flange part (11, 12). This suppresses damage to the flange parts W11 and W12 due to the laser beam irradiation, increasing product reliability.

Figure 12:
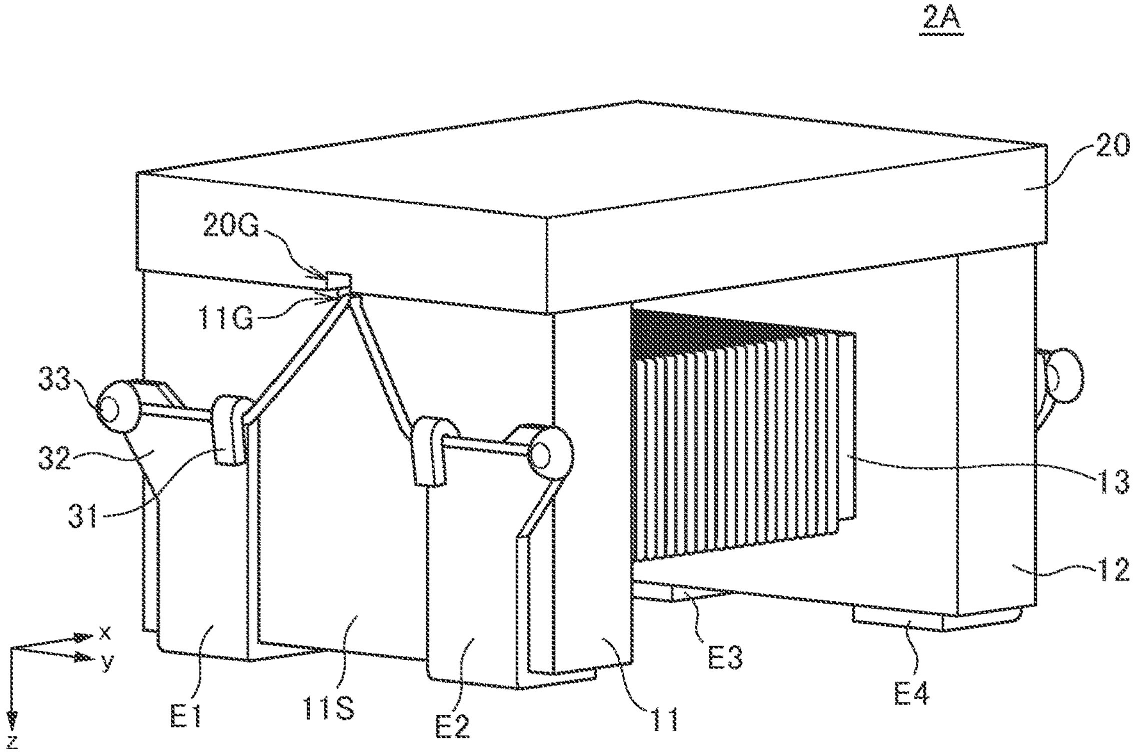
FIG. 12 is a schematic perspective view illustrating the outer appearance of the coil component 2A according to a modification.

FIG. 12 is a schematic perspective view illustrating the outer appearance of the coil component 2A according to a modification.

The coil component 2A according to the modification differs from the above coil component 2 in that the welding part 32 does not have the tab shape but has a flat plate shape. Other basic configurations are the same as those of the above coil component 2, so the same reference numerals are given to the same elements, and overlapping description is omitted.

As described above, the welding part 32 may have a flat plate shape.

It is apparent that the present invention is not limited to the above embodiments, but may be modified and changed without departing from the scope and spirit of the invention.

What is claimed is:

1. A coil component comprising:

a drum-shaped core including a flange part and a winding core part;

a terminal fitting fixed to the flange part; and a wire wound around the winding core part and having an end portion connected to the terminal fitting, wherein the flange part has an outer surface positioned on a side opposite to the winding core part, wherein the terminal fitting has i) a positioning part for positioning the wire, ii) a welding part having a tab shape bent at a first bending position so that the welding part positions the wire by sandwiching the wire in an axial direction of the winding core part, and iii) a weld bead formed as a result of welding between the welding part of the terminal fitting and the end portion of the wire, wherein the positioning part and the weld bead are both positioned on the outer surface of the flange part, wherein the weld bead has a protruding part that does not overlap the flange part, wherein the positioning part has a tab shape bent at a second bending position so that the positioning part positions the wire at the second bending position by sandwiching the wire, wherein a part of the wire located between the positioning part and the welding part extends in a first direction perpendicular to the axial direction, wherein the first bending position and the second bending position are different in a second direction perpendicular to the axial direction and the first direction such that the second bending position overlaps with the welding part when viewed from the first direction and that the first bending position does not overlap with the positioning part when viewed from the first direction, and wherein the weld bead overlaps with the second bending position when viewed from the first direction without overlapping with the first bending position when viewed from the first direction.

2. The coil component as claimed in claim 1, wherein an extending direction of the wire changes before and after the positioning part.

3. The coil component as claimed in claim 1, wherein the welding part completely overlaps with the flange part of the drum-shaped core when viewed from the axial direction.

4. A coil component comprising:

a first core including a flange part and a winding core part extending in a first direction;

first and second terminal fittings fixed to the flange part and arranged in a second direction perpendicular to the first direction;

a first wire wound around the winding core part and having an end portion connected to the first terminal fitting by a first weld bead; and a second wire wound around the winding core part and having an end portion connected to the second terminal fitting by a second weld bead, wherein the first terminal fitting has a first positioning part for positioning the first wire and a first welding part having a tab shape bent at a first bending position so that the first welding part positions the first wire by sandwiching the first wire in the first direction, wherein the second terminal fitting has a second positioning part for positioning the second wire and a second welding part having a tab shape bent at a second bending position so that the second welding part positions the second wire by sandwiching the second wire in the first direction, wherein a width of the flange part in the second direction is smaller than a distance between outer edges of the first and second weld beads, wherein the first positioning part has a tab shape bent at a third bending position so that the first positioning part positions the first wire at the third bending position by sandwiching the first wire, wherein the second positioning part has a tab shape bent at a fourth bending position so that the second positioning part positions the second wire at the fourth bending position by sandwiching the second wire, wherein a part of the first wire located between the first positioning part and the first welding part extends in the second direction, wherein a part of the second wire located between the second positioning part and the second welding part extends in the second direction, wherein the first bending position and the third bending position are different in a third direction perpendicular to the first and second directions such that the third bending position overlaps with the first welding part when viewed from the second direction and that the first bending position does not overlap with the first positioning part when viewed from the second direction, wherein the second bending position and the fourth bending position are different in the third direction such that the fourth bending position overlaps with the second welding part when viewed from the second direction and that the second bending position does not overlap with the second positioning part when viewed from the second direction, wherein the first weld bead overlaps with the third bending position when viewed from the second direction without overlapping with the first bending position when viewed from the second direction, and wherein the second weld bead overlaps with the fourth bending position when viewed from the second direction without overlapping with the second bending position when viewed from the second direction.

5. The coil component as claimed in claim 4, wherein each of the first and second weld beads has a first section overlapping the flange part in the first direction and a second section not overlapping the flange part in the first direction.

6. The coil component as claimed in claim 4, wherein a maximum distance between the first welding part and the second welding part in the second direction is smaller than a width of the flange part in the second direction.

7. The coil component as claimed in claim 6, wherein the first welding part completely overlaps with the flange part of the first core when viewed in the second direction.

8. The coil component as claimed in claim 7, wherein the second welding part completely overlaps with the flange part of the first core when viewed in the second direction.

* * * * *